(12) United States Patent
Chamon et al.

(10) Patent No.: US 9,355,363 B2
(45) Date of Patent: May 31, 2016

(54) SYSTEMS AND METHODS FOR VIRTUAL PARALLEL COMPUTING USING MATRIX PRODUCT STATES

(71) Applicants: TRUSTEES OF BOSTON UNIVERSITY, Boston, MA (US); UNIVERSITY OF CENTRAL FLORIDA RESEARCH FOUNDATION, INC., Orlando, FL (US)

(72) Inventors: Claudio Chamon, Lexington, MA (US); Eduardo R. Mucciolo, Oviedo, FL (US)

(73) Assignees: University of Central Florida Research Foundation, Inc., Orlando, FL (US); Trustees of Boston University, Boston, MA (US)

( * ) Notice: Subject to any disclaimer, the term of this patent is extended or adjusted under 35 U.S.C. 154(b) by 525 days.

(21) Appl. No.: 13/762,278

(22) Filed: Feb. 7, 2013

(65) Prior Publication Data
US 2014/0223147 A1 Aug. 7, 2014

(51) Int. Cl.
*G06N 99/00* (2010.01)
*G06F 17/16* (2006.01)
*B82Y 10/00* (2011.01)
*G06F 9/30* (2006.01)

(52) U.S. Cl.
CPC .............. *G06N 99/002* (2013.01); *B82Y 10/00* (2013.01); *G06F 17/16* (2013.01); *G06F 9/30029* (2013.01)

(58) Field of Classification Search
None
See application file for complete search history.

(56) References Cited

U.S. PATENT DOCUMENTS

2005/0167658 A1\* 8/2005 Williams et al. ............... 257/31
2006/0224547 A1\* 10/2006 Ulyanov et al. ................ 706/62

OTHER PUBLICATIONS

Stephan Hoyer, "Quantum Random Walk Search on Satisfiability Problem", B. A. Thesis published by Department of Physics and Astronomy, Swarthmore College, 2008, pp. 1-63.\*
Matthew Low, "The Use of Matrix Product State Representations in Simulating Many Body Quantum Systems", B. S. Thesis published by the Faculty of Science, The University of British Columbia, Vancouver, British Columbia, Canada, Jun. 2010, pp. 1-51.\*
Jaroslaw Adam Miszczak, "Singular Value Decomposition and Matrix Reorderings in Quantum Information Theory", International Journal of Modern Physics C, vol. 22, No. 9 (2011), pp. 897-918.\*
Paulo Benicio De Sousa and Rubens Viana Ramos, "Universal Quantum Circuit for n-Qubit Quantum Gate: A Progammable Quantum Gate", Quantum Information & Computation, vol. 7 Issue 3, Mar. 2007, pp. 228-242.\*

(Continued)

*Primary Examiner* — Kakali Chaki
*Assistant Examiner* — Walter Hanchak
(74) *Attorney, Agent, or Firm* — Preti Flaherty; Beliveau & Pachios LLP (57) ABSTRACT

A virtual parallel computing system and method represents bits with matrices and computes over all input states in parallel through a sequence of matrix operations. The matrix operations relate to logic gate operators to carry out a function implementation that represents a problem to be solved. Initial matrices are prepared to encode the weights of all input states, which can be binary states. Intermediate results can be simplified to decrease computational complexity while maintaining useful approximation results. The final matrices can encode the answer(s) to the problem represented by the function implementation. The system and method are particularly useful in speeding up database searches and in counting solutions of satisfiability problems.

23 Claims, 3 Drawing Sheets

(56) References Cited

OTHER PUBLICATIONS

Igor L. Markov and Yaoyun Shi, "Simulating Quantum Computation by Contracting Tensor Networks", SIAM Journal on Computing, vol. 38, Issue 3, Jun. 25, 2008, pp. 963-981.*

J. Ignacio Cirac, et al., "Renormalization and Tensor Product States in Spin Chains and Lattices", J. Phys. A: Math. Theor. 42 (2009), 34 pgs.

Kristan Temme, et al., "Stochastic Matrix Product States", Physical Review Letters 104, May 2010, 4 pgs.

B. Derridat, et al., "Exact Solution of a 1D Asymmetric Exclusion Model Using a Matrix Formulation", J. Phys. A: Math. Gen. 26 (1993), pp. 1493-1517.

F. Verstraete, et al., "Matrix Product States, Projected Entangled Pair States, and Variational Renormalization Group Methods for Quantum Spin Systems", Advances in Physics, Jul. 2008, 83 pgs.

Claudio Chamon, et al., "Rényi Entropies as a Measure of the Complexity of Counting Problems", Journal of Statistical Mechanics: Theory and Experiment, Apr. 2013, 13 pgs.

Guifré Vidal, "Efficient Simulation of One-Dimensional Quantum Many-Body Systems", Physical Review Letters, vol. 93, No. 4, Jul. 2004, 4 pgs.

Claudio Chamon, et al., "Virtual Parallel Computing and a Search Algorithm Using Matrix Product States", Physical Review Letters 109, Jul. 2012, 4 pgs.

Guifré Vidal, "Efficient Classical Simulation of Slightly Entangled Quantum Computations", Physical Review Letters, vol. 91, No. 14, Oct. 2003, 4 pgs.

T.H. Johnson, et al., "Dynamical Simulations of Classical Stochastic Systems Using Matrix Product States", Physical Review E 82 (2010) 16 pgs.

Ian Affleck, et al., "Rigorous Results on Valence-Bond Ground States in Antiferromagnets", Physical Review Letters, vol. 59, No. 7, Aug. 1987, 4 pgs.

* cited by examiner

SYSTEMS AND METHODS FOR VIRTUAL PARALLEL COMPUTING USING MATRIX PRODUCT STATES

STATEMENT REGARDING FEDERALLY SPONSORED RESEARCH OR DEVELOPMENT

This invention was made with Government Support under Contract Numbers CCF-1116590 and CCF-1117241 awarded by the National Science Foundation. The Government has certain rights in the invention.

BACKGROUND

The present disclosure relates generally to computational systems and methods, and relates more particularly to the encoding of information in matrices and to computational techniques involving matrix manipulations.

Interference and the ability to follow many history paths simultaneously make quantum systems attractive for implementing computations, such as may be possible with quantum computers. Efficient algorithms exploring these properties have been proposed to solve practical problems such as number factoring and unsorted database searches. These algorithms have a number of advantages compared to classically implemented algorithms, especially when quantum computers with thousands of quantum bits become available. Despite recent progress in developing quantum mechanics systems capable of processing information, the number of available quantum bits is somewhat small, e.g., in the tens of bits, making the implementation of a useful quantum computer problematic. Accordingly, a sufficiently large and resilient quantum computer that can take advantage of the above-mentioned algorithms is not yet available.

Hard computational problems are those in which the solution expressed as a number of computational steps scales faster than a power of the size of the input data, e.g. $\sim O(2^{n^q})$. In attempting to find better and more efficient ways to solve hard problems with conventional computers, recent advances in the study of quantum many-body systems provide some guidance. For example, the time evolution of a large class of one-dimensional interacting systems can be efficiently simulated by expressing their wave functions in a matrix product state (MPS) form and by using a time-evolving block decimation (TEBD). Even though many-body interactions tend to increase the rank of the matrices over time, it is possible to use truncation along the evolution to keep the matrices relatively small, such that the resulting wave function approximates quite accurately the exact one without an exponential computation cost. In quantum systems, local interactions do not quickly entangle a one-dimensional many-body state, justifying the matrix truncation. The evaluation of classical probability distributions in the form of an MPS has also been performed in the context of non-equilibrium phenomena of physical systems.

SUMMARY

In accordance with the present disclosure, a system and a method of computation that utilizes MPS to solve hard computational problems are provided. In particular, the present disclosure can provide computations to organize data to permit solutions to hard computational problems to be obtained through simplified operations involving matrices. When hard computational problems can be mapped onto a search problem, the present disclosure is suitable for obtaining solutions for such search problems. The proposed system and method describe configuration states in terms of weights or a probability distribution written as traces of matrix product states associated with bit configurations. Inputs to a function describing a problem to be solved are provided as one or more matrices, which are manipulated by the implementation of the function to produce MPS's that contribute to locating solutions to the problem.

According to an aspect of the disclosure, an MPS formulation of classical probability distributions is employed to create a virtual parallel machine where all possible outcomes of an algorithm are obtained from all $2^n$ inputs of an n-bit register. Information about these outcomes is encoded and compressed in the matrices forming the MPS. This parallelism is useful when a certain problem can use the probability of a single outcome at a time. For example, a search problem that seeks, for a given y, the value of x such that $y=f(x)$ for an algorithmically computable function $f$ can employ parallelism using the probability of the given y. In this case, the focus is not on all values of the output, but on only one corresponding to a given y. In addition, from the probability of y, the method in this invention directly provides the number of input values x satisfying the functional constraint $y=f(x)$.

According to an aspect of the present disclosure, there can be parallelism between the steps of the method and those of a logic circuit. Insertion and removal of matrices correspond to insertion and removal of bits in a bit register. Proposed 1-bit and 2-bit gates have matrix operations counterparts. The operations of 2-bit gates rely on a singular value decomposition (SVD) to maintain the MPS form of the probability distribution. Matrices are not restricted to be positive. All these operations preserve the positivity and the overall normalization of the probability. Matrix operations also provide the benefit of permitting direct computation on compressed data, whereby calculations ordinarily performed on uncompressed data, with the attendant compression and decompression processes, can be avoided, thereby leading to greater efficiencies.

As an example of a hard computational problem to which the disclosed system and method may be applied, consider the problem of checking which gene combination produces a certain specific feature (e.g., a trait or a genetic disorder). If you have n of these genes, there are $2^n$ combinations of having or not having each of the n genes. Checking combinations one-by-one is not feasible if n is very large. Let $f(x)$ be a function that, given a certain gene combination gives you 1 if the combination has the desired feature and gives you 0 otherwise. In this particular application, you would use a software (i.e., a compiler) to transform $f(x)$ into a sequence of gates acting on the binary variables that enumerate x. In practice, these gates are basically a set of instructions for operating on matrices (e.g., at least 2n matrices). The matrices are stored in the computer's RAM. The method disclosed in this application uses the computer's processor to manipulate these matrices and find gene combinations with the specific feature.

The presently disclosed system and method is applied to evaluating a multivariable Boolean expression for satisfiability, or obtaining and counting the instances satisfying the expression. The application of the disclosure to bit states is unique in the field of computational efforts, unlike known applications for many-body wave functions. The disclosed system and method is also applied to a database search algorithm.

BRIEF DESCRIPTION OF THE SEVERAL VIEWS OF THE DRAWINGS

The present disclosure is described in greater detail below, with reference to the accompanying drawings, in which.

DETAILED DESCRIPTION

In accordance with the present disclosure, computer operations are performed using matrix product states (MPS) in the realization of a function describing a problem to be solved, and an input to the function. One or more matrices can be used to represent all inputs at once, thereby utilizing parallelism in the computational process. The input matrices are initialized and the matrices evolve according to an applied function. The function itself can be realized using one bit and two bit gates, where the one bit gates are probabilistic gates, and the two bit gates are deterministic gates.

Figure 1:
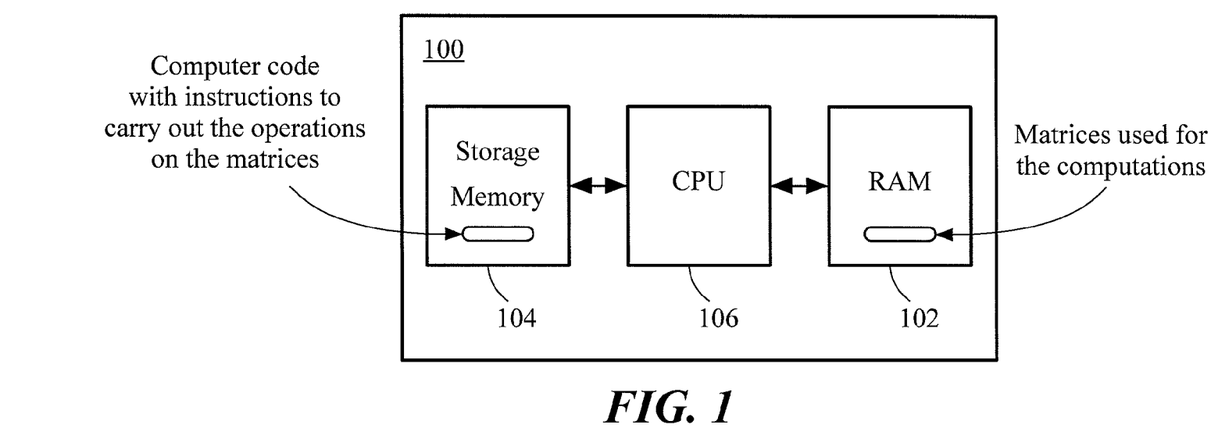
FIG. 1 is a block diagram of a computer system capable of implementing the disclosed system and method.

FIG. 1 shows a computer system 100 capable of implementing an exemplary embodiment of the system and method of the present disclosure. Matrices used in the disclosed computations can be stored in RAM 102, while the computer code that can be executed by a CPU 106 to carry out the computations can be stored in memory 104.

Figure 2:
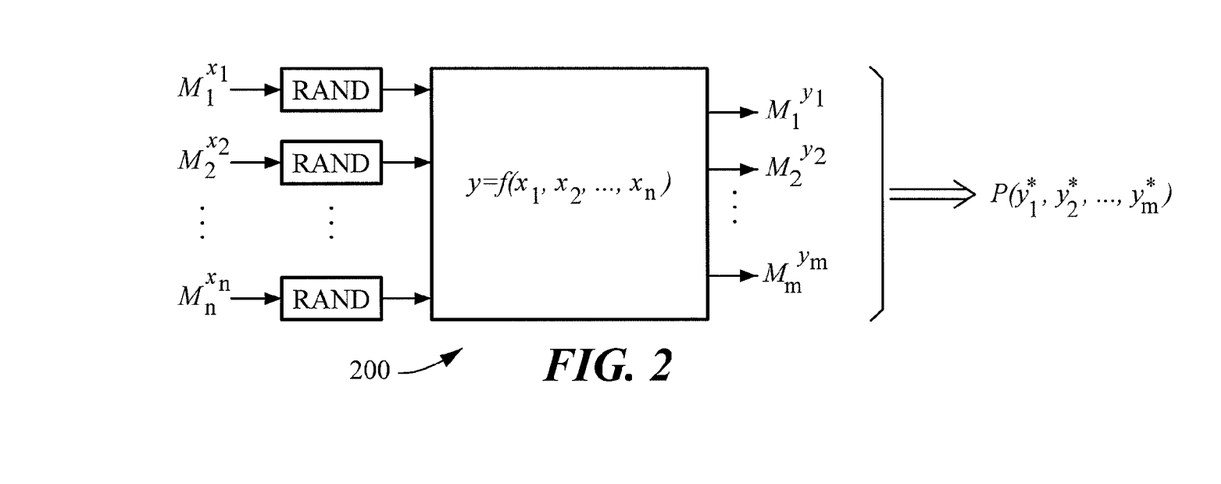
FIG. 2 is a block diagram that illustrates matrix operation procedures involved in determining the probability of a certain outcome of a multi-component logic function y=ƒ(x) in accordance with an exemplary embodiment of the present disclosure.

Referring now to FIG. 2, a block diagram of a system 200 according to an exemplary embodiment of the present disclosure is illustrated. According to an exemplary embodiment, system 200 can be implemented on computer system 100 (FIG. 1). In accordance with system 200, consider a set of n binary variables $\{x_j=0, 1\}_{j=1, \ldots, n}$ (henceforth named bits), with the vector $|x_1 x_2 \ldots x_n\rangle \equiv |x\rangle$ denoting a particular configuration of this system. Define the vector $$|P\rangle = \sum_{x_n, \ldots, x_1 = 0,1} P(x_1, \ldots, x_n) |x_1 \ldots x_n\rangle, \quad (1)$$

where the probability of a configuration $|x\rangle$ $$P(x_1, \ldots, x_n) = tr(M_1^{x_1} \ldots M_n^{x_n}). \quad (2)$$

Here, each $M_j^{x_j}$ is a real matrix of dimensions $D_{j-1} \times D_j$ representing a bit j with a state $x_j$. The trace can be dropped if we consider the first and last matrices to be row and column vectors, i.e., $D_0 = D_n = 1$. The vector $|P\rangle$ is normalized in the following sense: define a vector $|\Sigma\rangle = \Sigma_{x_1, \ldots, x_n = 0,1} |x_1 \ldots x_n\rangle$, then a normalization constant $Z = \langle \Sigma | P \rangle = 1$ since $\Sigma_x P(x) = 1$. Consider the bits laid orderly along a straight line, referred to as the bit string. The matrix dimension $D_j$ is referred to as the bond dimension between adjacent bits j and j+1.

Starting from an initial probability distribution $P_0(x_1, \ldots, x_n)$ the vector $|P\rangle$ evolves as a sequence of 1-bit and 2-bit operations on adjacent bits is applied to the matrices $M_j^{x_j}$. These operations follow a Boolean function ƒ(x), analogous to a logic circuit, which is designed according to the particular computational problem of interest. It has been shown that, for a Boolean function ƒ(x), the function can be completely realized using a sequence of 1-bit and 2-bit gates. Bit operations are implemented on the matrices as follows.

1-Bit Gates:

A probabilistic 1-bit gate takes states 0, 1 into states 0, 1 with probabilities p,1−p and q, 1−q:

$$0 \xrightarrow{p} 0$$

or $$0 \xrightarrow{1-p} 1$$

$$1 \xrightarrow{1-q} 0$$

or $$1 \xrightarrow{q} 1.$$

Figure 3:
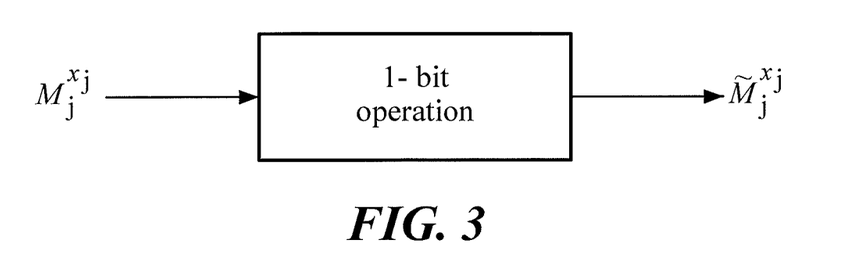
FIG. 3 is a block diagram that illustrates a 1-bit matrix operation.

The probabilities p and q are encoded into a transfer function $t^{\tilde{u}, u}$ that takes a logic input a=0, 1 into a logic output ã=0, 1. Explicitly: $t^{0, 0} = p$, $t^{1, 0} = 1-p$, $t^{0, 1} = 1-q$, $t^{1, 1} = q$. FIG. 3 illustrates a 1-bit gate acting on the matrices corresponding to bit j, namely, $M_j^{x_j}$, which yields new matrices according to the expression $$\tilde{M}_j^{x_j} = \sum_{x'_j = 0,1} t^{x_j, x'_j} M_j^{x'_j}. \quad (3)$$

The transfer function $t^{x_j, x'_j}$ satisfies the sum rule $\Sigma_{\tilde{a}=0,1} t^{\tilde{a}, a} = 1$, which ensures that the normalization Z=1 is maintained along the computation. Examples of 1-bit gates are: (a) Deterministic NOT, with p=0 and q=0, (b) RAND, with p=½ and q=½, which randomizes the bit, (c) RST, with p=1 and q=0, which resets the bit to 0. 1-bit gates preserve matrix dimensions, for example by carrying the input to the output, in conjunction with providing the processed output.

2-Bit Gates:

Given two logical functions A(a, b) and B(a, b), we construct the deterministic 2-bit transfer function $T^{\tilde{a}, \tilde{b}; a, b}$ in the following way:

$$T^{\tilde{a},\tilde{b};a,b} = \begin{cases} 1, & \tilde{a} = A(a, b) \text{ and } \tilde{b} = B(a, b), \\ 0, & \text{otherwise.} \end{cases} \quad (4)$$

This transfer function takes bits from states a and b to states ã and b̃, respectively. Similarly to 1-bit gates, the normalization after 2-bit gates is preserved since the transfer matrix satisfies the sum rule $\Sigma_{\tilde{a}, \tilde{b}=0,1} T^{\tilde{a}, \tilde{b}; a, b} = 1$. A 2-bit gate acting on adjacent bits j−1 and j takes their matrix product $M_{j-1}^{x_{j-1}} M_j^{x_j}$ into a larger single matrix according to the expression $$Q_{j-1,j}^{x_{j-1}, x_j} = \sum_{x'_{j-1}, x'_j = 0,1} T^{x_{j-1}, x_j, x'_{j-1}, x'_j} M_{j-1}^{x'_{j-1}} M_j^{x'_j}. \quad (5)$$

While the input matrices $M_{j-1}^{x_{j-1}}$ and $M_j^{x_j}$ have $D_{j-2} \times D_{j-1}$ and $D_j \times D_j$ matrix elements, respectively, the resulting matrix $Q_{j-1,j}$ has a total of $2D_{j-2} \times 2D_j$ matrix elements. In order to bring the result of Eq. (5) back to a matrix product form, a singular value decomposition (SVD) of the matrix $Q_{j-1,j}^{x_{j-1}, x_j}$ is performed. For this purpose, the matrix is organized in the following block form:

$$Q_{j-1,j} = \quad (6)$$

$$\begin{pmatrix} \sum_{x'_{j-1},x'_j=0,1} T^{0,0;x'_{j-1},x'_j} M_{j-1}^{x'_{j-1}} M_j^{x'_j} & \sum_{x'_{j-1},x'_j=0,1} T^{0,1;x'_{j-1},x'_j} M_{j-1}^{x'_{j-1}} M_j^{x'_j} \\ \sum_{x'_{j-1},x'_j=0,1} T^{1,0;x'_{j-1},x'_j} M_{j-1}^{x'_{j-1}} M_j^{x'_j} & \sum_{x'_{j-1},x'_j=0,1} T^{1,1;x'_{j-1},x'_j} M_{j-1}^{x'_{j-1}} M_j^{x'_j} \end{pmatrix}.$$

The singular value decomposition can be carried out using standard linear algebra techniques. After the decomposition, $Q_{j-1,j} = U\Lambda V$, where U and V are orthogonal matrices of dimensions $2D_{j-2} \times 2D_{j-2}$ and $2D_j \times 2D_j$, respectively, and $\Lambda$ is a diagonal rectangular matrix of dimensions $2D_{j-2} \times 2D_j$ containing the singular values. More explicitly, $\Lambda_{\alpha\alpha} = \lambda_\alpha > 0$, where $a=1, \ldots, r$, with $r \leq \min(2D_{j-2}, 2D_j)$, and $\Lambda_{\alpha\beta} = 0$ for $\alpha \neq \beta$. Here, r denotes the rank of the matrix $Q_{j-1,j}$.

The resulting matrices for the bits $j-1$ and $j$ are obtained through the expressions $$[\tilde{M}_{j-1}^0]_{\alpha\beta} = [U]_{\alpha\beta}\sqrt{\lambda_\beta}, \alpha 1, \ldots, D_{j-2}, \beta = 1, \ldots, r \quad (7)$$

$$[\tilde{M}_{j-1}^1]_{\alpha\beta} = [U]_{\alpha\beta}\sqrt{\lambda_\beta}, \alpha = D_{j-2}+1, \ldots, 2D_{j-2}, \beta = 1, \ldots, r \quad (8)$$

$$[\tilde{M}_j^0]_{\alpha\beta} = \sqrt{\lambda_\alpha}[V]_{\alpha\beta}, \alpha = 1, \ldots, r, \beta = 1, \ldots, D_j \quad (9)$$

$$[\tilde{M}_j^1]_{\alpha\beta} = \sqrt{\lambda_\alpha}[V]_{\alpha\beta}, \alpha = 1, \ldots, r, \beta = D_j+1, \ldots, 2D_j. \quad (10)$$

Figure 4:
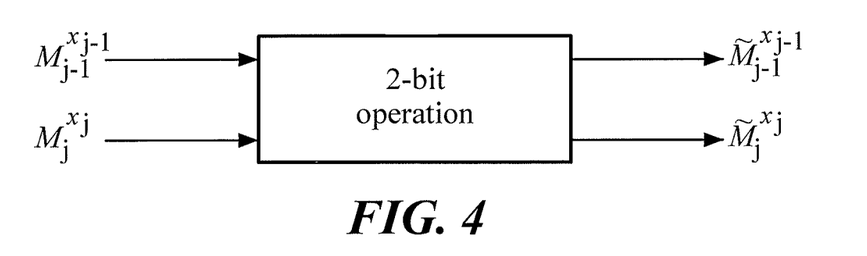
FIG. 4 is a block diagram that illustrates a 2-bit matrix operation.

Using these matrices, Eq. (5) can be rewritten as $$\tilde{M}_{j-1}^{x_{j-1}} \tilde{M}_j^{x_j} = \sum_{x'_{j-1},x'_j=0,1} T^{x_{j-1},x_j;x'_{j-1},x'_j} M_{j-1}^{x'_{j-1}} M_j^{x'_j}. \quad (11)$$

These are the resulting matrices illustrated in FIG. 4 following the 2-bit gate operation. One consequence of the 2-bit gate operation is a change in the bond dimension between bits $j-1$ and $j$, namely, $D_{j-1}$, becomes $\tilde{D}_{j-1} = r$. The other matrix dimensions remain unchanged.

Below, block forms of the matrix $Q_{j-1,j}$ for five common 2-bit gates used in applications of the invention are presented: AND, NAND, OR, XOR, SWAP, and COPY. For logic operations, the first bit carries forward its state, while the result of the operation is stored in the second bit.

AND gate: $A_{AND}(a,b) = a$ and $B_{AND}(a,b) = a \wedge b$. In this case, $T^{0,0;0,0} = T^{0,0;0,1} = T^{1,1;1,1} = 1$, with all other elements set to zero.

$$Q_{j-1,j}^{AND} = \begin{pmatrix} M_{j-1}^0 M_j^0 + M_{j-1}^0 M_j^1 & 0 \\ M_{j-1}^1 M_j^0 & M_{j-1}^1 M_j^1 \end{pmatrix}. \quad (12)$$

NAND gate: $A_{NAND}(a,b) = a$ and $B_{NAND}(a,b) = \wedge(a \neg b)$. In this case, $T^{0,1;0,0} = T^{0,1;0,1} = T^{1,1;1,0} = T^{1,0;1,1} = 1$, with all other elements set to zero.

$$Q_{j-1,j}^{AND} = \begin{pmatrix} 0 & M_{j-1}^0 M_j^0 + M_{j-1}^0 M_j^1 \\ M_{j-1}^1 M_j^0 & M_{j-1}^1 M_j^0 \end{pmatrix}. \quad (13)$$

OR gate: $A_{OR}(a,b) = a$ and $B_{OR}(a,b) = a \vee b$. In this case, $T^{0,0;0,0} = T^{0,1;0,1} = T^{1,1;1,0} = T^{1,1;1,1} = 1$, with all other elements set to zero.

$$Q_{j-1,j}^{OR} = \begin{pmatrix} M_{j-1}^0 M_j^0 & M_{j-1}^0 M_j^1 \\ 0 & M_{j-1}^0 M_j^0 + M_{j-1}^0 M_j^1 \end{pmatrix}. \quad (14)$$

XOR gate: $A_{XOR}(a,b) = a$ and $B_{XOR}(a,b) = a \oplus b$. In this case, $T^{0,0;0,0} = T^{0,1;0,1} = T^{1,1;1,0} = T^{1,0;1,1} = 1$, with all other elements set to zero.

$$Q_{j-1,j}^{XOR} = \begin{pmatrix} M_{j-1}^0 M_j^0 & M_{j-1}^0 M_j^1 \\ M_{j-1}^1 M_j^1 & M_{j-1}^1 M_j^0 \end{pmatrix}. \quad (15)$$

SWAP gate: $A_{SWAP} = (a,b) = b$ and $B_{SWAP}(a,b) = a$. In this case, $T^{0,0;0,0} = T^{1,0;0,1} = T^{0,1;1,0} = T^{1,1;1,1} = 1$, with all other elements set to zero.

$$Q_{j-1,j}^{SWAP} = \begin{pmatrix} M_{j-1}^0 M_j^0 & M_{j-1}^1 M_j^0 \\ M_{j-1}^0 M_j^1 & M_{j-1}^1 M_j^1 \end{pmatrix}. \quad (16)$$

COPY gate: $A_{COPY}(a,b) = a$ and $B_{COPY}(a,b) = a$. In this case, $T^{0,0;0,0} = T^{0,0;0,1} = T^{1,1;1,0} = T^{1,1;1,1} = 1$, with all other elements set to zero.

$$Q_{j-1,j}^{COPY} = \begin{pmatrix} M_{j-1}^0 M_j^0 + M_{j-1}^0 M_j^0 & 0 \\ 0 & M_{j-1}^0 M_j^0 + M_{j-1}^0 M_j^1 \end{pmatrix}. \quad (17)$$

IDENTITY gate: $A_{IDENTITY}(a,b) = a$ and $B_{IDENTITY}(a,b) = b$. In this case, $T^{0,0;0,0} = T^{0,1;0,1} = T^{1,0;1,0} = T^{1,1;1,1} = 1$, with all other elements set to zero.

$$Q_{j-1,j}^{IDENTIFY} = \begin{pmatrix} M_{j-1}^0 M_j^0 & M_{j-1}^0 M_j^1 \\ M_{j-1}^1 M_j^0 & M_{j-1}^1 M_j^1 \end{pmatrix}. \quad (18)$$

Filters:

Given a set of matrices defining a matrix product state, it is possible to filter out certain bit configurations by resorting to a sequence of 2-bit gates which do not preserve probability. These gates differ from those described earlier in the sense that their transfer matrices $T^{\tilde{a},\tilde{b};a,b}$ do not satisfy the sum rule $\Sigma_{\tilde{a},\tilde{b}=0,1} T^{\tilde{a},\tilde{b};a,b} = 1$. All other aspects, such as singular value decomposition, are the same as for the probability preserving 2-bit gates. Consider for example a situation where it is desired to remove all configurations where the bits j and j−1 are different, irrespective of the other bits, namely, configurations where $x_j = 0, x_{j-1} = 1$ or $x_j = 1, x_{j-1} = 0$. This operation can be implemented by a filter of the logic form $(x_j \oplus x_{j-1})$, which can be realized by a transfer matrix of the form $T^{0,0;0,0} = T^{1,1;1,1} = 1$ and with all other elements set to zero. Given that two bits span 4 possible states (00, 01, 10, 11), there are 14 nontrivial 2-bit filter gates (out of 16): 4 that block 3 out of 4 possible states; 6 that block 2 out of 4 possible states; and 4 that block 1 out of the 4 possible states. The other filter gates, which may be considered trivial, are those that block all or block none of the 4 possible states.

Bit Insertions and Removals: Insertion of a new bit (say, initially set to 0) in between bits j−1 and j amounts to replacing $M_{j-1}^{x_{j-1}} M_j^{x_j}$ with $M_{j-1}^{x_{j-1}} M_\alpha^{x_\alpha} M_j^{x_j}$, where $M_\alpha^1$ and $M_\alpha^0$ are $D_{j-1} \times D_{j-1}$ null and identity matrices, respectively, and the total sum over bit configurations in the vector |P⟩ [see Eq. (1)] now includes the binary variable $x_\alpha=0, 1$. Removal of a bit is done by absorbing its matrix into the one of an adjacent bit, namely, by tracing it out. For example, the operation expressed as $\Sigma_{x_j=0, 1} M_j^{x_j} M_{j+1}^{x_{j+1}} = \tilde{M}_{j+1}^{x_{j+1}}$ is used to remove bit j.

Application: Search algorithm.

Consider the search problem where, given a function $y=f(x)$ that can be computed algorithmically with $O(n^d)$ gates and a certain value for y, search for an input x that yields as output $y=f(x)$.

Matrix product states can express the probability values of all possible m-bit outputs $y \equiv y_1 y_2 \ldots y_m$ if one starts with a product state encoding all possible n-bit inputs $x \equiv x_1 x_2 \ldots x_n$, namely, $P(x)=2^{-n}$ for all x. The problem can be solved by computing P(y). The following steps illustrate an exemplary embodiment.

1. Start with all bits $x_i$, i=1, ..., n, randomized with equal probabilities of ½ for being 0 or 1. Compute final output matrices $M_j^{y_j}$, j=1, ..., m, resulting from the action of the circuit that evaluates $f(x)$.
2. Compute the probability P(y) for the given y of interest. If $P(y) \geq 2^{-n}$, then there is at least one value of x such that $y=f(x)$.
3. Fix one of the input bits, say $x_1$, to be 0, instead of randomizing it. Recompute the output matrices $M_j^{y_j}$, j=1, ..., m, and the new probability P(y). Again test if the probability is above the threshold, $P(y) \geq 2^{-n+1}$ in this case. If the probability fell below the threshold, reset $x_1$ to 1.
4. Repeat step 3 fixing now input bit $x_2$ to be 0 and calculating the output matrices and the new probability. Continue repeating step 3, fixing input bit $x_3$ to be 0, and so on until input bit $x_n$ is fixed to be 0. At the end of n steps, having fixed all the n bits of the input, we have arrived at one value for x such that $y=f(x)$.

Notice that since there may be more than one x for a given y, P(y) being above the corresponding threshold does not mean that fixing each input bit to be 1 is necessarily forbidden. Accordingly, the computational process can be run again with the input bits being fixed to different values than in the initial run(s), and additional solutions can be determined where P(y) is determined to be above the corresponding threshold.

In additional to finding solutions, the above described system and method can be used to count the total number of possible solutions. For this purpose, P(y) is multiplied by $2^n$ after step 2 above. The result is the number of possible solutions x such that $f(x)=y$ for a given y.

Figure 5:
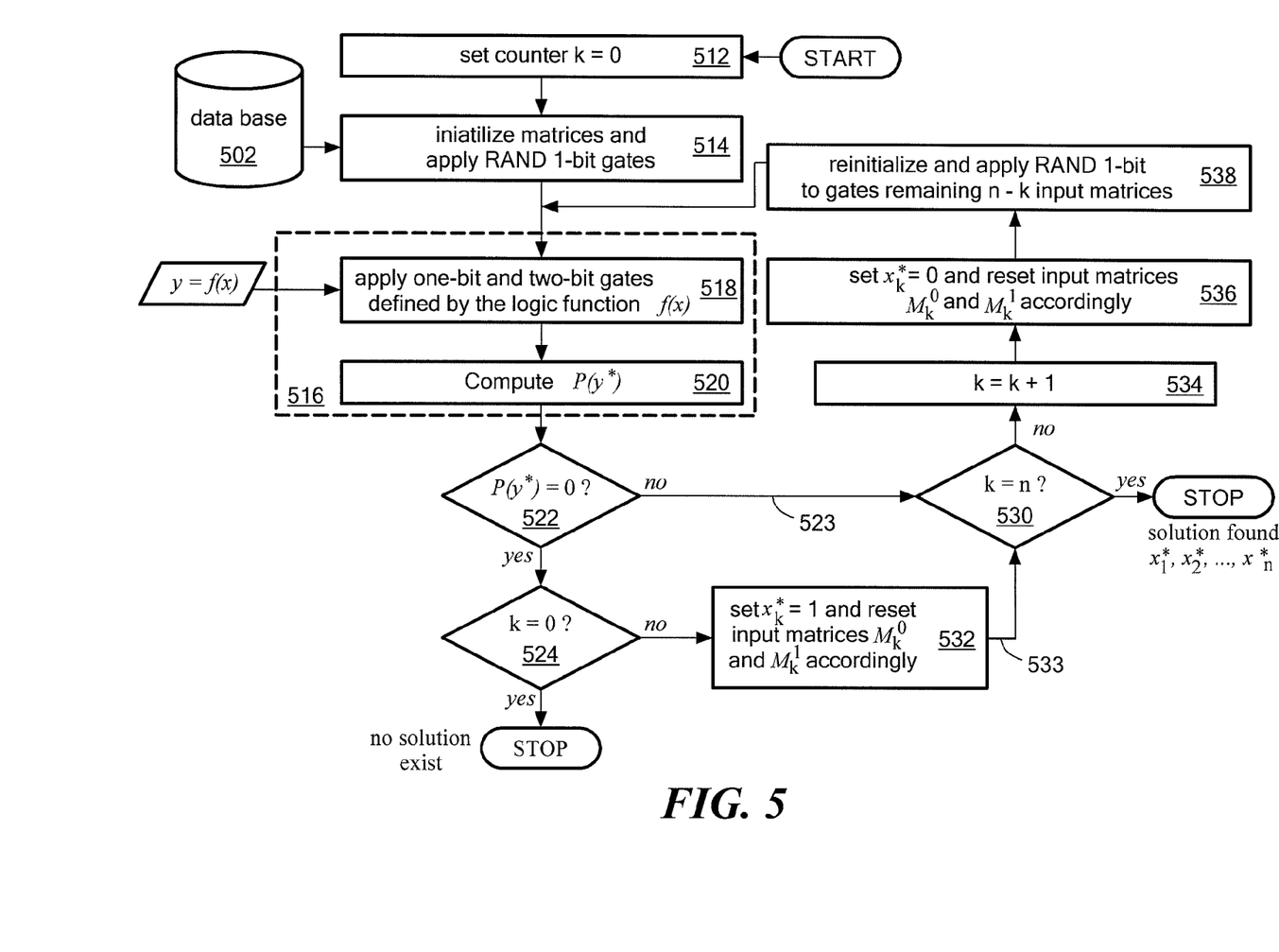
FIG. 5 is a flowchart of an exemplary embodiment of the disclosed system and method for implementing a data base search.

Referring now to FIG. 5, an exemplary embodiment of the disclosed system and method is illustrated in a flowchart 500. Flowchart 500 illustrates a database search application using the presently disclosed system and method. The computational process illustrated in flowchart 500 begins with a counter k being set to zero as illustrated in a block 512. Counter k is used to represent the number of bits for which the process will be performed. In a block 514, the initialization of the matrices representing all bits is undertaken, as well as the application of 1-bit gates used to randomize the inputs. For example, example, all bits $x_i$, i=1, ..., n, are assigned random probabilities that, in this exemplary embodiment, are equal, meaning a probability of 0.5 for each of the bits being 0 or 1. Although a randomizing function is illustrated in block 514 for setting uniform probabilities for bit states, the probability can set to any useful value for each of the input bit states. For example, a priori knowledge of the function $f(x)$ or solutions can be used to condition the initial probabilities of the input bit states. Alternatively, the initial matrices or input states can be obtained from a database 502, which can also store the randomized probability matrices resulting from the application of the 1-bit gates used to set the initial probabilities of the input state.

A block 516 illustrates the determination of $y=f(x)$ with the implementation of the logic function in a block 518 and the computation of the resulting probabilities in a block 520. Block 518 illustrates the implementation of the function using 1-bit and/or 2-gates that define the logic function used to calculate the final output matrices $M_j^{y_j}$, j=1, ..., m. The final output matrices are used to compute the probability of the output state represented by the final output matrices, as illustrated in block 520.

The particular output state can have a probability of zero, meaning that there is not a solution. The determination of whether the probability of the output state is zero is illustrated in decision block 522, where zero probability causes the "yes" branch to be taken, while non-zero probability causes the "no" branch to be taken. If the "yes" branch of decision block 522 is taken, counter k is checked to see if it is a zero value, as illustrated in decision block 524. If counter k is equal to zero, none of the input bits have been set to a fixed value, and no solution exists to the problem implemented as the logic function illustrated in block 518. At that point, the process illustrated in flow chart 500 stops, as illustrated by the "yes" branch of decision block 524.

If k is not equal to zero in decision block 524, a non-initial state has been processed with a probability of P(y)=0, where at least one of the input bits is fixed to a value. In this case, additional output probabilities can be processed, as illustrated with the "no" branch of decision block 524 being taken to a block 532. Block 532 illustrates an input bit $x_i$ being set to 1, and its input matrices being reset accordingly. By fixing the input bit to a certain value, the process illustrated in flowchart 500 moves closer to a solution to the problem. The value of counter k is then compared to the number of bits n, as illustrated in a decision block 530. If counter k=n, the process is complete with at least one solution being found, as illustrated with the "yes" branch of decision block 530. If the value of counter k is not yet equal to n, as illustrated by the "no" branch of decision block 530, counter k is incremented, as illustrated in a block 534.

When the probability of the output state is non-zero, a potential solution has been determined, which is illustrated with the "no" branch of decision block 522 being taken to decision block 530. The "no" branch being taken from decision block 522 means that, for example, $P(y) \geq 2^{-n+k}$, and that there is at least one value of x such that $y=f(x)$. Note that the threshold for the computed probability depends on a value of counter k, and thus changes with each pass through the process, as more input bits are fixed in value. However, each input state with a non-zero probability can potentially be a solution, which is why the probability is checked for being non-zero, as illustrated in decision block 522. Decision block 530 illustrates the determination of whether all bits have been processed, and if so, indicates that the solution(s) has(have) been found, as illustrated with the "yes" branch of decision block 530. If all bits have not been processed, counter k is incremented, as illustrated with the "no" branch of decision block 530 directed to block 534.

After counter k is incremented, as illustrated in block 534, a new input state is formed as illustrated in a block 536. For example, block 536 illustrates input bit x, being set to be 0 on the first pass through, instead of being randomized, and 1-bit randomizing gates are applied to the n-k remaining input matrices, as illustrated in a block 538. The process in block 516 is then reiterated and the logic function operations are applied to the input matrices. Output matrices $M_j^{y_j}$, $j=1, \ldots, m$, and the new probability $P(y)$ are then recomputed as illustrated in blocks 518 and 520. The newly calculated probability is tested to see if it is equal to zero to determine if the new configuration of input states is a solution to the logic function, as illustrated in decision block 522. If the probability is zero, then the input bit state is not a solution, which is illustrated by the "yes" branch of decision block 522. If this is not the first pass through the process, meaning that counter k is not 0, the input bit that was set to a fixed value of 0, as illustrated in block 536, is reset to 1, as illustrated in block 532 being reached by the "no" branch of decision block 524. Again, counter k is checked for being equal to n, and if so, the process terminates with a solution, as illustrated with the "yes" branch in decision block 530. Otherwise, the steps of flowchart 500 are repeated with k being incremented with each iteration, as is illustrated in block 534. With each iteration, a new bit is fixed to determine the probability of the input state. For example, input bit $x_2$ is fixed to a value and the matrices and probabilities are then recalculated, followed by input bit $x_3$ being set to a fixed value, and so on until we finally fix input bit $x_n$. At the end of n steps, having fixed all the n bits of the input, we have arrived at one value for x such that $y=f(x)$.

In additional to finding solutions, the method illustrated in flowchart 500 can be used to count the total number of possible solutions. For this purpose, $P(y)$ is multiplied by $2^n$ after being computed. The result is the number of possible solutions x such that $f(x)=y$ for a given y.

The computational cost of the search algorithm discussed above is one of the advantages attained in accordance with the present disclosure. According to an exemplary embodiment, a determination of the computational cost can be stated in terms of the largest matrix dimension D in the computations, which is related to the number $n_g$ of gates involved in the computation of the function $f(x)$. All SVD steps involve matrices with rank smaller or equal to D; therefore, the cost associate to gate operations is no more than $O(n_g \times D^3)$. Computing the trace of the matrix products for a fixed y yields the probability $P(y)$, which takes time no more than $O(n \times D^3)$. Also, the procedure is repeated for each iteration in which the input bits x, $i=1, \ldots, n$ are each fixed in turn. Therefore, in the worst case, the time is $O(n \times \max\{n_g, n\} \times D^3)$ to find x.

The method can be further sped up by retaining only the largest singular values during the SVD steps. The number of singular values that are kept can be varied according to the particular function being computed.

The number of solutions of a search problem can be found by multiplying the probability $P(y^*)$ in block 520 by $2^n$. If the result is equal to s, s solutions exist. After the first solution has been found, additional solutions can be obtained one-by-one by repeating the same procedure but including the following extension to the method. To find one more solution, one builds a filter function that blocks input configurations that correspond to previously found solutions. The filter functions can be broken down using the 2-bit filter gates. The search algorithm can then be used again, but now applying the gates encoding the filter function in conjunction with the gates encoding the function $f(x)$.

Generalizations:

Although one-dimensional bit arrays have been presented, the present disclosure is not so limited, and can be extended to higher dimension tensor products. The presently disclosed system and method can be generalized to consider non-normalized weights $W(x)$ instead of probabilities $P(x)$ in Eq. (1). In such a case one can use 1-bit and 2-bit gates with arbitrary transfer matrices $t^{\tilde{a}, a}$ in Eq. (3) and $T^{\tilde{a}, \tilde{b}; a, b}$ in Eq. (5), respectively. Alternatively, or in addition, non-normalized weights $W(x)$ and/or probabilities $P(x)$ can be used initially and/or in describing the matrices that represent one or more output states.

According to aspects of the present disclosure, the system and method can be generalized to encode a database as a matrix product state. The matrices are constructed so as to encode weights $W(x)$, where x is an n-bit number, and such that $W(x)=1$ if x belongs to the database, and $W(x)=0$ if otherwise. This feature permits database information to be distributed into matrix form, where the matrices can be efficiently processed to analyze the data.

Example:

As an example of a matrix computation according to aspects of the present disclosure, consider the following multi-component Boolean expression of the type $y=f(x)$, with $y=(y_1, y_2)$ and $x=(x_1, x_2, x_3, x_4)$:

$$f_1(x_1, x_2, x_3, x_4) = x_1 \vee (x_2 \wedge (\neg x_3 \vee x_4)) \qquad (19)$$

$$f_2(x_1, x_2, x_3, x_4) = (\neg x_2 \vee x_3) \wedge (\neg x_1 \vee (x_2 \wedge x_4)). \qquad (20)$$

These expressions satisfy the truth table shown below. Notice that $P(0, 0)=0$, while $P(0, 1)=5/16$, $P(1, 0)=9/16$, and $P(1, 0)=1/16$.

| $x_1$ | $x_2$ | $x_3$ | $x_4$ | $f_1$ | $f_2$ |
|---|---|---|---|---|---|
| 0 | 0 | 0 | 0 | 0 | 1 |
| 0 | 0 | 0 | 1 | 0 | 1 |
| 0 | 0 | 1 | 0 | 0 | 1 |
| 0 | 0 | 1 | 1 | 0 | 1 |
| 0 | 1 | 0 | 0 | 1 | 0 |
| 0 | 1 | 0 | 1 | 1 | 0 |
| 0 | 1 | 1 | 0 | 0 | 1 |
| 0 | 1 | 1 | 1 | 1 | 1 |
| 1 | 0 | 0 | 0 | 1 | 0 |
| 1 | 0 | 0 | 1 | 1 | 0 |
| 1 | 0 | 1 | 0 | 1 | 0 |
| 1 | 0 | 1 | 1 | 1 | 0 |
| 1 | 1 | 0 | 0 | 1 | 0 |
| 1 | 1 | 0 | 1 | 1 | 0 |
| 1 | 1 | 1 | 0 | 1 | 0 |
| 1 | 1 | 1 | 1 | 1 | 1 |

The following sequence of matrix operations can be used to compute $f_1$ and $f_2$ in the above truth table.

Initialize 1×1 matrices $M_1^0$, $M_1^1$, $M_2^0$, $M_2^1$, $M_3^0$, $M_3^1$, $M_4^0$, and $M_4^1$ to ½.

INSERT bit 5
COPY bit 4 bit 5
SWAP bits 4, 5
NOT on bit 3
OR on bits 3, 4
NOT on bit 3
SWAP bits 3, 4
AND on bits 2, 3
SWAP bits 2, 3
OR on bits 1, 2
SWAP bits 1, 2
(result of $f_1$ in bit 1, all others shifted to the right by one)
SWAP bits 4, 5
AND on bits 3, 4
SWAP bits 3, 4
NOT on bit 2
OR on bits 2, 3
NOT on bit 4
OR on bits 4, 5
SWAP bits 4, 5
AND on bits 3, 4

SWAP bits 3, 4
SWAP bits 2, 3
(result of $f_2$ in bit 2)
TRACE OUT bit 5
TRACE OUT bit 4
TRACE OUT bit 3

The above matrix operations result in 1×2 matrices $M_1^0$ and $M_1^1$ and 2×1 matrices $M_2^0$ and $M_2^1$. The probabilities are then given by $P(0, 0) = M_1^0 M_2^0$, $P(0, 1) = M_1^0 M_2^1$, $P(1, 0) = M_1^1 M_2^0$, and $P(1, 1) = M_1^1 M_2^1$.

The operations herein depicted and/or described herein are purely exemplary and imply no particular order. Further, the operations can be used in any sequence when appropriate and can be partially used. With the above embodiments in mind, it should be understood that they can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared and otherwise manipulated.

Any of the operations depicted and/or described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The disclosed systems and methods can also be embodied as computer readable code on a computer readable medium. The computer readable medium is any data storage device that can store data, which can thereafter be read by a computer system. Examples of the computer readable medium include hard drives, read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

The foregoing description has been directed to particular embodiments of this disclosure. It will be apparent, however, that other variations and modifications may be made to the described embodiments, with the attainment of some or all of their advantages. The procedures, processes and/or modules described herein may be implemented in hardware, software, embodied as a computer-readable medium having program instructions, firmware, or a combination thereof. For example, the function described herein may be performed by a processor executing program instructions out of a memory or other storage device. Therefore, it is the object of the appended claims to cover all such variations and modifications as come within the true spirit and scope of the disclosure.

What is claimed is:

1. A method implemented on a computer with a processor executing instructions from a memory to compute, in parallel, weights of binary outputs of an algorithmically computable function given weights of binary inputs for a set of N bits, the method comprising:
   storing a plurality of input matrices that encode the weights of the binary inputs for the set of N bits, each weight defined by a product of the input matrices, with each input matrix associated with a binary state for a bit in the set of N bits, the input matrices describing a set of possible inputs for the algorithmically computable function;
   storing the algorithmically computable function as interconnected gates that each represents a matrix operation, at least one of the gates performing a matrix operation on at least one matrix that is input to the respective gate;
   applying the interconnected gates to the plurality of input matrices to obtain a plurality of output matrices that encode the weights of the binary outputs; and
   calculating a weight of a given output based at least in part on the plurality of output matrices, the weight of the given output indicating a probability that the given output is generated by the algorithmically computable function using the set of possible inputs.

2. The method of claim 1, further comprising applying a randomizing function that is implemented with at least one 1-bit gate to the plurality of initial matrices.

3. The method of claim 1, wherein the interconnected gates further comprise a sequence that includes one or more of a 1-bit gate or a 2-bit gate.

4. The method of claim 3, further comprising:
   constructing a transfer matrix associated with the at least one 1-bit gate; and
   applying the transfer matrix to the plurality of input matrices representing a binary state 0 and a binary state 1 for the given bit.

5. The method of claim 4, wherein the transfer matrix associated with the at least one 1-bit gate is represented by a 2×2 transfer matrix that conserves probability.

6. The method of claim 4, wherein the transfer matrix associated with the at least one 1-bit gate implements one or more of a matrix NOT gate, a matrix RAND gate or a matrix RESET gate.

7. The method of claim 3, wherein the sequence includes at least one 2-bit gate, the method further comprising:
   constructing a transfer matrix associated with the at least one 2-bit gate;
   storing four matrices representing four binary states 00, 01, 10, 11 for two given bits;
   applying the transfer matrix to the four matrices to obtain a resulting matrix of greater dimension;
   performing singular value decomposition on the resulting matrix; and
   assigning four new matrices to represent a logic state 0 and 1 for one of the two bits, and a logic state 0 and 1 for the other of the two bits based on the singular value decomposition of the resulting matrix.

8. The method of claim 7, wherein the transfer matrix associated with the at least one 2-bit gate implements one or more of a matrix AND gate, a matrix OR gate, a matrix NAND gate, a matrix XOR gate, a matrix SWAP gate, a matrix COPY gate or a matrix IDENTITY gate.

9. The method of claim 7, wherein the transfer matrix associated with the at least one 2-bit gate is represented by a 4×4 transfer matrix which is not restricted so as to conserve probability.

10. The method of claim 3, further comprising inserting auxiliary bits by introducing new matrices to represent logic states 0 and 1 of auxiliary bits and assigning numerical values to entries of these matrices.

11. The method of claim 3, further comprising removing a bit by summing the plurality of input matrices representing the binary state for the bit and multiplying the resulting matrix by matrices representing a remaining bit.

12. The method of claim 1, further comprising:
fixing a binary state for a bit; and
applying the interconnected gates to the plurality of input matrices associated with a binary state for the bit with the fixed binary state.

13. The method of claim 1, further comprising calculating a number of possible solutions by multiplying the probability by a factor related to a number of input bits.

14. A non-transitory computer-readable medium that stores instructions executable by a processor to compute, in parallel, weights of binary outputs of an algorithmically computable function given weights of binary inputs for a set of N bits, the instructions being executable to implement a method comprising:
storing a plurality of input matrices that encode the weights of the binary inputs for the set of N bits, each weight defined by a product of the input matrices, with each input matrix associated with a binary state for a bit in the set of N bits, the input matrices describing a set of possible inputs for the algorithmically computable function;
storing the algorithmically computable function as interconnected gates that each represents a matrix operation, at least one of the gates performing a matrix operation on at least one matrix that is input to the respective gate;
applying the interconnected gates to the plurality of input matrices to obtain a plurality of output matrices that encode the weights of the binary outputs; and
calculating a weight of a given output based at least in part on the plurality of output matrices, the weight of the given output indicating a probability that the given output is generated by the algorithmically computable function using the set of possible inputs.

15. A method implemented on a computer with a processor executing instructions from a memory to search for inputs to an algorithmically computable function that yields a given output, the method comprising:
storing a plurality of input matrices that encode weights of binary inputs for a set of N bits, each weight defined by a product of the input matrices, each input matrix associated with a binary state for a bit in the set of N bits, the plurality of input matrices describing a set of possible inputs;
translating the algorithmically computable function into a sequence of operations configured to be applied to matrices;
applying the sequence of operations to the input matrices to generate a plurality of output matrices that represent weights of binary outputs;
computing the weight of a binary output by multiplying the output matrices corresponding to a sequence of bit states of the binary output;
determining an existence of the given output by checking that the weight of the given output is greater than zero, wherein the existence of the given output indicates that the given output is present in a set of possible outputs generated by the algorithmically computable function using the set of possible inputs;
in response to determining the existence of the given output, modifying the plurality of input matrices; and
iteratively applying, computing, determining and modifying to obtain one or more solutions.

16. A method implemented on a computer with a processor executing instructions from a memory to compute a number of possible input solutions to an algorithmically computable function that yields a given output, the method comprising:
storing a plurality of input matrices that encode weights of binary inputs for a set of N bits, each weight defined by a product of the input matrices, each input matrix associated with a binary state for a bit in the set of N bits, the plurality of input matrices describing a set of possible inputs;
translating the algorithmically computable function into a sequence of operations configured to be applied to the input matrices;
applying the sequence of operations to the input matrices to generate a plurality of output matrices that represent weights of binary outputs;
computing the weight of the given output by multiplying the output matrices; and
determining, based at least in part on the weight of the given output, the number of possible input solutions.

17. The method of claim 16, wherein operating on the weight further comprises multiplying the weight of each output state by $2^n$, where n is a number of input bits, to determine the number of possible input solutions.

18. The method of claim 16, further comprising storing matrices that encode via a matrix product a probability for each input state.

19. The method of claim 18, wherein the probability encoded by the matrices is uniform over all input states.

20. The method of claim 1, wherein the plurality of input matrices are each weighted with non-normalized weight factors.

21. The method of claim 1, further comprising storing the plurality of output matrices on a non-transitory computer-readable medium.

22. A system for computing, in parallel, weights of binary outputs of an algorithmically computable function given a weights of binary inputs for a set of N bits, the system comprising:
one or more processors operative to execute instructions stored in one or more memories to:
store a plurality of input matrices that encode the weights of the binary inputs for the set of N bits, each weight defined by a product of the input matrices, with each input matrix associated with a binary state for a bit in the set of N bits, the input matrices describing a set of possible inputs for the algorithmically computable function;
store the algorithmically computable function as interconnected gates that each represents a matrix operation, at least one of the interconnected gates performing a matrix operation on at least one matrix that is input to the respective gate;
apply the interconnected gates to the plurality of input matrices to obtain a plurality of output matrices that encode the weights of the binary outputs; and
calculate a weight of a given output based at least in part on the plurality of output matrices, the weight of the given output indicating a probability that the given output is generated by the algorithmically computable function using the set of possible inputs.

23. A system for computing the probability of binary outputs of any algorithmically computable function given a probability of binary inputs, comprising:
a storage unit being operative to store a plurality of input matrices and to store the algorithmically computable function as interconnected gates, wherein the plurality of input matrices encode the weights of the binary inputs for the set of N bits, each weight defined by a product of the input matrices, with each input matrix associated with a binary state for a bit in the set of N bits, the input matrices describing a set of possible inputs for the algorithmically computable function and the interconnected gates each represents a matrix operation, at least one of the gates performing a matrix operation on at least one matrix that is input to the respective gate;

a matrix logic engine coupled to the storage unit and being operative to apply the interconnected gates to the plurality of input matrices to obtain a plurality of output matrices that encode the weights of the binary outputs; and a calculation unit being operative calculate a weight of a given output based at least in part on the plurality of output matrices, the weight of the given output indicating a probability that the given output is generated by the algorithmically computable function using the set of possible inputs.

* * * * *